Feb. 18, 1969 G. BOGNER ET AL 3,428,925

SUPERCONDUCTOR HAVING INSULATION AT ITS EXTERIOR SURFACE
WITH AN INTERMEDIATE NORMAL METAL LAYER

Filed Feb. 16, 1967

United States Patent Office 3,428,925
Patented Feb. 18, 1969

3,428,925
SUPERCONDUCTOR HAVING INSULATION AT ITS EXTERIOR SURFACE WITH AN INTERMEDIATE NORMAL METAL LAYER

Günther Bogner, Erlangen, and Richard Dötzer, Nuremberg, Germany, assignors to Siemens Aktiengesellschaft, a corporation of Germany

Filed Feb. 16, 1967, Ser. No. 616,652
Claims priority, application Germany, Feb. 18, 1966, S 102,095
U.S. Cl. 335—216 15 Claims
Int. Cl. H01f 7/22

ABSTRACT OF THE DISCLOSURE

A superconductor which is provided at its exterior surface with an insulator in the form of an oxide of a metal selected from the group consisting of aluminum and beryllium, this insulator having an outer surface directed away from and an inner surface directed toward the superconductor and being in the form of an oxide only through a part of its depth extending from the outer surface toward but terminating short of its inner surface. This layer of insulation may directly surround the superconductor which may take the form of a wire made of a high-field superconductor material, so that the insulator has next to the superconductor a non-oxidized metallic layer and spaced from the superconductor by this latter layer an outer layer of the oxide of aluminum or beryllium.

Figure 1:
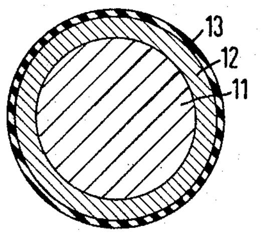

Our invention relates to the insulation of superconductors.

In particular, our invention relates to insulation for high-field superconductors which are adapted to be used in superconducting coils and which are composed of individual wires, cables, or tapes.

It is a primary object of our invention to increase the extent to which superconductors of this type can be loaded with current.

Superconductors are of considerable importance in the electrotechnical arts in general and in particular for use in the manufacture of coils designed to achieve intense magnetic fields. Their great significance for such purposes results from the fact that at low temperatures which are beneath the critical temperature for the particular superconducting material the superconductor has no ohmic resistance as long as predetermined critical values for the current and magnetic field are not exceeded. It is known to cover superconductors with electrical insulation of organic insulating material such as, for example, materials known under the trade names of Mylar and Hostaphan, these materials being polyethylene terephthalate or epoxy resins. Also it is known to cover superconducting wires, for insulation purposes, with coatings of the metals silver, copper, or gold, these metals retaining their normal electrical conductivity at the operating temperature of the superconductor and thus having a very high electrical resistance as compared to that of the superconductor itself. (German Patent 1,166,370.)

Insulation provided by way of one of the above metals which remains at normal electrical conductivity during operation of the superconductor is however inadequate in many cases and has certain disadvantages. In particular, relatively large superconducting magnetic coils, whose windings are made of superconducting wires having insulation of this type, require very long exciting times, since the windings are short circuited through the metal coatings which remain at normal electrical conductivity. On the other hand, it has been found that the so-called degradation effect is sharply reduced by using insulation coverings of metals which remain at normal electrical conductivity during operation of the superconductor, in particular in the case of copper or silver and in the case where intense magnetic fields are achieved by the use of so-called high-field superconductors or hard superconductors, such as, for example, the superconducting alloy of niobium-zirconium or the superconducting intermetallic compound of niobium-tin ($Nb_3Sn$) and vanadium-gallium ($V_3Ga$). The degradation effect resides in the fact that the superconductor of the coil windings will undergo a transition into the normal conducting state at current densities which are much smaller than those which would cause short specimens of the same material to undergo this transition in the same magnetic field. This current degradation results in an increase in the material required to achieve a predetermined magnetic field. It results from electrical instabilities of the superconductor, these instabilities resulting in magnetic flux-jumping and localized transitions, of short duration, of the superconductor from the superconducting into the normal conducting state. It is therefore customary to use at the present time for the windings of larger superconducting coils wires or tapes of high-field superconductor material which, in order to reduce the degradation effect, are provided with insulation coverings of metals, such as copper or silver, for example, which, during operation of the coil, are still of good normal electrical conductivity and of good thermal conductivity, and in addition in order to reduce the time required for excitation they are provided with an insulation of an organic insulating material such as insulating lacquer or Mylar.

These organic insulating materials have the disadvantage of being of relatively poor thermal conductivity and poor heat permeability, particularly at low temperatures, thus making it difficult to provide the refrigeration of the superconductor material which is essential for the superconducting operation and on the other hand preventing a rapid dissipation of heat into the surrounding refrigerating medium, such heat resulting whenever the superconductor becomes normal conducting. As a result, there is a substantial detraction in the advantageous effect of the normally conductive metal insulation for the purpose of reducing the degradation effect. Moreover, because of the limited dielectric strength of these organic insulating materials, it is not possible to use less than a predetermined thickness of the insulating material, below a limit of the thickness being usually on the order of 30$\mu$m. Therefore, when using wire diameters on the order of 0.25 mm. for example, a considerable part of the cross section of the coil winding is formed by the insulating material itself. This factor reduces the compactness of the coil winding and results in a reduction of the magnetic field which can be achieved by means of a coil having a given length of wire.

It is, therefore, a primary object of our invention to provide a superconductor at its exterior surface with an insulation which will avoid the above drawbacks.

In accordance with a primary feature of our invention the insulation is made of an oxide of a metal selected from the group consisting of aluminum and beryllium.

Both aluminum oxide and beryllium oxide are particularly well suited for insulating superconductors. Aluminum oxide has at room temperature a thermal conductivity which is on the order of 100 times greater than that of conventional organic insulating material used up to the present time. Similar relationships are present at low temperatures. Moreover, aluminum oxide is an outstanding insulator. For example, it is possible to achieve at a temperature of 20° C. with an eloxadized layer of aluminum a dielectric strength of 90 volts per $\mu$m. Therefore, insulation layers of aluminum oxide can be maintained relatively thin. Thicknesses of between a few $\mu$m. up to approximately 20 $\mu$m. are sufficient. The thermal conductivity of beryllium oxide is even greater. Sintered beryllium oxide has, at room temperature, for example, a thermal conductivity of 3 watt·cm.$^{-1}$K.$^{-1}$ and at 4° K. it still has a thermal conductivity of 0.05 watt·cm.$^{-1}$·°K.$^{-1}$. These thermal conductivities are throughout the entire range between the above temperatures more than 100 times the thermal conductivity of known organic insulating material. The specific electrical resistance of beryllium oxide at room temperature is more than $10^{14}$ ohm·cm.

The use of aluminum oxide and beryllium oxide as insulators for superconductors therefore makes it possible to improve the cooling of the superconducting material as well as to provide a superior transfer into the cooling medium of heat which may be present in given cases in the superconductor. Furthermore, the thickness of the insulating layer can be reduced and thus the superconducting coil can have a much greater compactness. At the same time the relatively thin insulating layers of hard, friction-resistant aluminum oxide or beryllium oxide assure a very good mechanical low-temperature stability for the coil insulation. Even high temperatures, resulting in given case in improper control of the coil windings and resulting in destruction of organic insulating materials have no damaging effect on aluminum oxide or beryllium oxide insulation. Aluminum oxide and beryllium oxide layers are also less subject than organic insulating materials to radiation damage, such damage being likely to occur particularly when using the superconducting magnetic coil for particle accelerators.

The insulating oxide layer can be mounted on the superconductor in a number of different ways. It can surround the superconductor either entirely or in part, taking, for example, the form of a tape wound at given intervals around the wire super conductor. It is only of importance, in this connection, however, that the insulation prevent the adjoining superconductors from coming into elecrically-conducting contact with each other in the superconductor apparatus in which the superconductor is used. In a preferred construction of the superconductor assembly of our invention the superconductor is at least partly enveloped within a sheath of either aluminum or beryllium, and this sheath is provided with an oxide layer at least in the region of its outer surface. Preferably the sheath itself is oxidized at least from its outer surface toward but short of its inner surface so that the oxidation penetrates through only part of the depth or thickness of the sheath. The oxidation can be carried out either before or after the sheath is situated around the superconductor. The oxide layer is given a particularly great strength and a particularly good bond as a result of the layer therebeneath of the metallic component of the oxide.

When the oxidation is carried out after the insulation is united with the superconductor, this oxidation can only take place at the exposed exterior surface of the insulation which is directed away from the superconductor. Since the sheath is only oxidized through a part of its total thickness, there remains beneath the oxide layer an aluminum or beryllium layer by means of which the material situated within and surrounded by the sheath is protected against oxidation. The remaining inner layer of aluminum or beryllium can be relatively thin having a thickness on the order of a few μm., for example.

According to a further feature of our invention, the aluminum or beryllium coating which is provided with the insulating oxide layer can be situated at the location where up to the present time in the case of high-field superconductors it has been customary to provide coatings of metal which remain normally conductive during operation of the superconductor, such a metal being, in particular, copper, these normally conductive metal coatings acting to reduce the degradation effect and to provide a low-ohm parallel resistance for the superconductor. The superconductor assembly of our invention is therefore preferably constructed in such a way that the superconductor itself is provided with a coating of one of the metals aluminum and beryllium, this coating being oxidized through part of its thickness and through a region extending inwardly from its exterior exposed surface, and the thickness of the remaining metal layer which is surrounded by the oxide layer is at least as thick as the oxide layer. The thickness required for the remaining inner metallic layer, which is surrounded by the oxide layer, in order to provide a good operation as a parallel resistance, depends, therefore, in particular on the cross section of the superconductor. In the case of superconductors having a diameter on the order of 0.2–0.5 mm., this thickness of the remaining interior metal layer of the insulation coating will in general be between approximately 20 and 50 μm.

It is of particular advantage to use for the metal of the insulating sheath and for the metallic component of the insulating oxide ultrapure aluminum or beryllium having a purity of at least 99.99% by weight. Aluminum or beryllium coatings of such purity have, with respect to the reduction of the degradation effect, substantial advantages as compared to copper coatings which have been used up to the present time. Ultrapure aluminum has at low temperatures, particularly at the usual operating temperature of the superconductor of approximately 4.2° K., a higher electrical conductivity than copper of comparable purity and at least as good a thermal conductivity as copper, while at the same time it is much easier to manufacture than copper in its purest form. Furthermore, the magnetic resistance change of aluminum at low temperatures is substantially less than that of copper. Thus, when placed in a magnetic field of the same intensity, the electrical resistance of aluminum will increase to a lesser extent than that of copper. The current which flows, for example through the windings of the superconductor which forms the magnetic coil, can therefore be taken over in part by the aluminum coating in a much easier manner than by a copper coating, during transition of the superconductor in its critical state into normal conductivity as a result of exceeding the critical current, without, however, heating the superconductor material above its critical temperature at the prevailing magnetic field. Such heating of the superconductor would result in transition of the entire superconductor into the normal conducting state.

In order to demonstrate the superiority of ultra-pure aluminum over copper with respect to the current carrying capacity at low temperatures, certain specific measurement values may be considered. While the specific electrical resistance of annealed electrolytic copper of a purity of 99.99% by weight at 293° K. has with respect to the specific resistance thereof at 4.7° K. a ratio of 145:1, the same ratio for annealed aluminum of a purity of 99.99% by weight is 1075:1. By purifying the aluminum to an even greater extent it is possible to increase this resistance ratio up to approximately 30,000:1. Ultrapure beryllium has at low temperatures at least as good an electrical conductivity and a thermal conductivity as ultrapure aluminum. In addition, with increasing purity the ductility of the metals increases, so that in given cases the required cold deformation for smoothing and sealing the metal coating on the superconductor can be carried out more easily. Moreover, with increasing purity of the initial metal and by using suitable manufacturing processes, the insulating oxide layers become denser, more homogeneous, and harder. Also, the insulating properties, as well as the thermal conductivity and the mechanical stability of the oxide layers, which in any event are very good, become even better with increasing purity of the metallic component of the oxide.

An outstanding advantage of the aluminum coating as compared to the copper coating, resides furthermore, in the low recrystallization temperature of aluminum which diminishes with increasing purity and according to the purity of the aluminum is between −75° C. and +400° C.

During deformation of the superconductor, for example in order to manufacture the coil windings, cold deformations will be encountered, and as a result of these cold deformations the electrical residual resistance of the metallic coating of normal electrical conductivity will be sharply increased at low temperatures. Because of the low recrystallization temperature of aluminum, it is possible with the superconductor structure of our invention to cure the defects resulting from cold deformation out of the superconductor after the deformation thereof by tempering, the completely wound coil being tempered for example, and thus the damaging action of the cold deformation on the electrical resistance of the aluminum is eliminated. With a corresponding treatment of superconductors having copper coatings, it is necessary, on the other hand, because of the high recrystallization temperature of copper, to use temperatures greater than 600° C. Annealing at these temperatures is in general not possible, since the result would be an extremely unfavorable influence on the superconducting properties of the superconductor which is made, for example, of a superconducting intermetallic alloy of niobium-zirconium. Furthermore, with aluminum of the highest purity a considerable part of the defects will be cured out even at room temperature, so that in given cases annealing can in general be omitted. For tempering purposes the high temperature stability of the insulating oxide layer is of particular significance. At the present time the recrystallization temperature of ultrapure beryllium is not known. The recrystallization temperature of beryllium, however, undoubtedly becomes lower with increasing purity of the beryllium and under certain circumstances results in favorable values which are similar to those of aluminum.

A further advantage resulting from the use of aluminum or beryllium coatings together with an aluminum oxide or beryllium oxide insulation resides in the fact that beryllium and aluminum have a substantially smaller specific weight than copper. Thus, when using superconductors which are provided with beryllium or aluminum coatings, it is possible to sharply reduce the weight of the superconducting magnetic coil. This reduction in weight results at the same time in a considerable saving of cooling energy and cooling medium. In order to cool equal volumes of copper and aluminum from the temperature of liquid nitrogen (approximately 78° K.) down to the temperature of liquid helium (4.2° K.) it is necessary to use with aluminum approximately only half the amount of helium which is required to be used with copper. As compared to silver, the saving in cooling medium is even greater.

According to a further embodiment of a superconductor assembly according to our invention, there can be situated between the superconductor material itself and the sheath composed of aluminum or beryllium of their oxides, an intermediate layer of a different material which during operation of the superconductor has good normal electrical conductivity and good thermal conductivity. This intermediate layer can in particular be made of one of the metals copper, silver or gold. This construction of a superconductor according to our invention makes it possible to use the aluminum or beryllium oxide insulation with the commercially available high-field superconductors which have previously been provided with a metal coating which is of normal electrical conductivity during operation of the superconductor. Thus, this latter metal coating which is already found on the superconductor as purchased will serve to reduce the degradation effect. The aluminum or beryllium sheath will with this construction of the superconductor preferably be oxidized through its depth to such an extent that only an aluminum or beryllium layer of a few $\mu$m. thickness will remain to protect the normal metal coating which it surrounds. For providing the windings of a superconducting coil used for achieving a high magnetic field, it can furthermore be of advantage to form the higher-field superconductor material which makes up the superconductor from a plurality of individual conductors which are electrically connected in parallel with each other by the coatings of normal electrical conductivity. In this way it is possible to relieve by way of the parallel connected conductors the load which is encountered when individual conductors become electrically unstable for a period of short duration. Also, superconductors of this construction can advantageously be provided with an aluminum or beryllium oxide insulation.

Such a construction of a superconductor according to our invention will have the individual superconducting wires combined into a cable with these individual superconducting wires, which are made of high-field superconductive material, respectively covered with coatings which retain a good electrical normal conductivity and a good thermal conductivity during operation of the superconductor, and the bundle of twisted, coated wires which form the cable is surrounded by a sheath of aluminum or beryllium which is oxidized only through part of its thickness extending from its outer toward its inner surface.

Another embodiment of a suitable conductor assembly according to our invention is composed of a plurality of tapes of high-field superconductor material which are respectively covered with coatings which remain of good normal electrical conductivity and good thermal conductivity during operation of the superconductor, these coatings being sandwiched between the tapes to provide a compact package of tapes respectively surrounded by these coatings, and the entire package is itself surrounded by a sheath of aluminum or beryllium which is oxidized only through a part of its thickness extending from its outer toward its inner surface.

Suitable high-field superconductors may take the form, in particular, of wires or tapes of niobium-zirconium and niobium-titanium or wires and tapes with layers of niobium-tin ($Nb_3Sn$) and vanadium-gallium ($V_3Ga$). The coatings which cover the individual wires or tapes and which remain of normal electrical conductivity during operation can, for example, be made of copper, silver, or gold, or in particular can advantageously be made of aluminum or beryllium. Furthermore, in the case where the superconductor assembly takes the form of a cable composed of a plurality of twisted wires respectively provided with coatings, the spaces defined between the individual conductors can be filled with metal or alloys of good heat conductivity and low melting point as well as large heat capacity, so as to improve the electrical and thermal contact between the normally conductive coatings on the wires. Materials suitable for this latter purpose are, for example, indium, tin-indium or lead-bismuth. Instead of the spaces between the wires being filled with this material, it is also possible to provide thin coatings of the latter materials over the wires. While tin-indium and lead-bismuth become superconductive at low temperatures, only a small magnetic field is required to cause them to undergo transition into the normal conducting state, so that they are practically always in a normal conducting state during operation of a high-field superconductor in the form of a cable. Where the individual conductors take the form of tapes so as to form a package of superimposed tapes with the coatings thereon sandwiched therebetween, it is possible to solder the individual conductors to each other by means of thin layers of such a low melting metal situated between the individual conductors.

The sheath of aluminum or beryllium which carries the oxide layer can be situated on the superconductor in different ways. According to one embodiment of our invention the superconductor includes a sheath in the form of a coating deposited by electrolytic deposition and thereafter anodically oxidized through a part of its thickness. In another embodiment of a superconductor of our invention the sheath is formed by a thin tape which is wound around the superconductor with the edges of the tape overlapping each other, and this tape is anodically oxidized on one side after it is wound onto the superconductor. In this latter case, particularly where very pure aluminum is used for the tape, the overlapping edges thereof can be joined to each other by a cold-pressure welding process either by pulling on the tape to place the latter under tension or by compressing the wound tape, before oxidation. According to a still further embodiment of a superconductor assembly of our invention, the sheath can take the form of a tape wound around the superconductor either with overlapping edges or with spaces between the edges of the wound tape, and in either of these latter cases the tape can be anodically oxidized at one or both sides thereof before being wound around the superconductor.

The galvanic deposition of the preferably ultrapure aluminum or beryllium coating can in particular be advantageously brought about by way of an organic solution of a metal organic complex compound of the metal which is to be deposited. Also, the initial material which serves as ultrapure aluminum or beryllium tapes can be derived from such solutions in an electrolytic manner. The ultrapure metal which is derived in this way can be manufactured into tapes by rolling.

The manufacture of the oxide layer takes place advantageously by anodic oxidation of the exterior surface of the aluminum or beryllium in a known eloxidation bath, preferably in an oxalic acid bath or in a sulphuric acid bath.

Superconductors constructed in accordance with our invention are particularly suitable for use as the windings of superconducting magnetic coils designed to achieve very high magnetic fields. Particular advantages are provided when there are situated between the individual layers of the windings of a coil formed from the superconductor structure of the invention foils of aluminum of a purity of at least 99.99% by weight having oxide layers at its exterior surfaces. The aluminum foils, which advantageously extend laterally beyond the sides of the winding package to provide free projecting side edge portions of the aluminum foil which may be surrounded by the cooling medium, provide together with the good thermal conductivity of the oxide coatings of the superconductor an outstanding cooling of the coil windings. Furthermore, they can take the form of short-circuit cylinders, so that during transition of the magnetic coil into the normal electric conducting state they can take over the magnetic field energy and uniformly distribute the latter so that in this way they will protect the coil from failure. With respect to their electrical and thermal conducting capacities as well as their low recrystallization temperature, the aluminum foils provided with the oxide layers possess the above-described advantages of ultrapure aluminum coatings. In the event that the insulating oxide layers of the superconductors of the coil windings are in themselves thick enough to act as a dielectric for the largest possible potential between a pair of successive layers of windings of the magnet coil, the aluminum foil situated between each pair of successive layers of windings need not be provided with oxide layers.

In coil windings composed of superconductors of circular or similar cross-sectional configuration, the wedge-shaped spaces defined between the superconductors can be filled with an easily meltable metal of good thermal conductivity and large heat capacity, such as, for example, indium, lead or gallium or with a low melting alloy, such as, for example, tin-indium or lead-bismuth. In this way there is an increase in the thermal contact between the cooling foils which are inserted in the windings and the exterior oxide surface of the superconductor. In order to fill the spaces between the windings, the coil, after it has been completed, can be brought up to the melting temperature of the filling material and then evacuated, whereupon the liquid metal is forced under pressure into the spaces between the windings. The high temperature stability of the oxide insulation of our invention is an important prerequisite for this purpose. For relatively large superconductor cross sections the filling material can be in wire form and can be wound in layers in the wedge-shaped spaces between the superconductor windings, or the filling material can take the form of foils inserted between the wires and the cooling foils. With the application of a small amount of heat the filling material is then pressed into the spaces between the superconductor windings during the winding. When using superconductors with ultrapure aluminum or beryllium coatings as well as with cooling foils of ultrapure aluminum, it is possible, by annealing the completed coil windings or, in the case of large coil units, by annealing of individual sections of the coil windings, to cure out the mechanical stresses in the coatings and foils, so that in this way the electrical residual resistance of the materials can be reduced.

Figure 3:
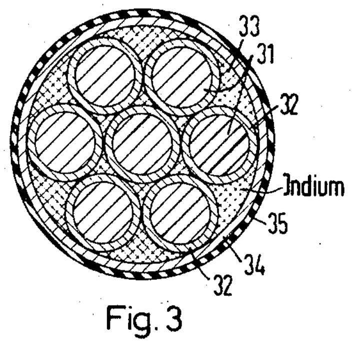
Figure 4:
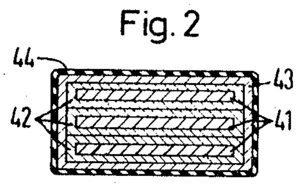
Figure 5:
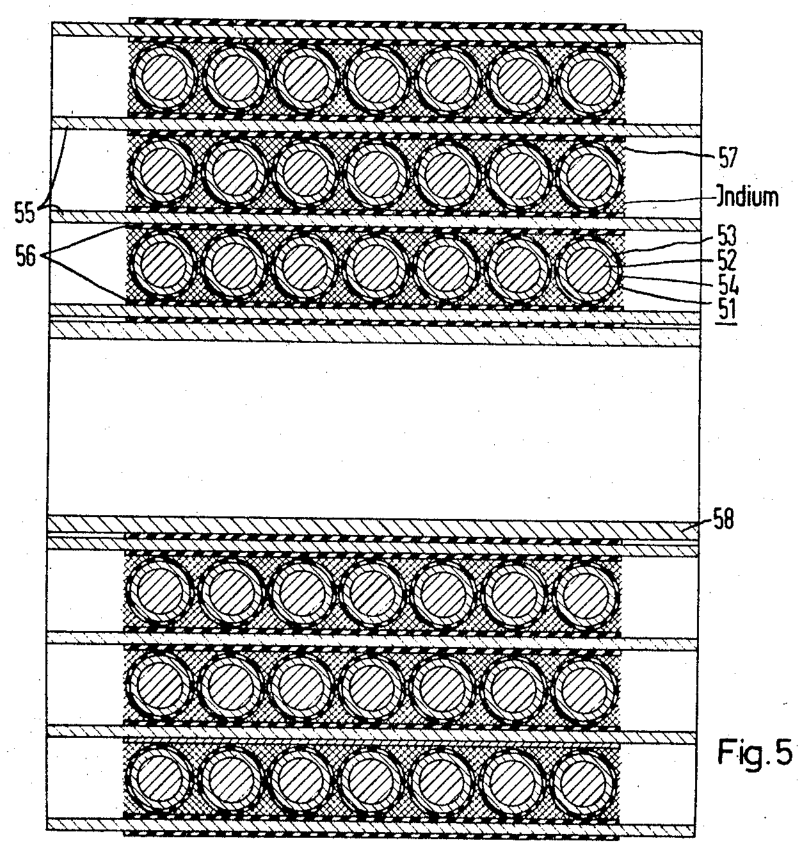

Our invention is illustrated by way of example in the accompanying drawings which form part of this application and in which:

FIGS. 1–4 respectively show schematically and at a highly enlarged scale, in cross section, different possible embodiments of superconductors according to our invention; and FIG. 5 is a schematic cross-sectional illustration of the windings of a superconducting coil composed of superconductors according to our invention.

FIG. 1 illustrates a superconducting wire having the structure of our invention. The superconductor 11, which may, for example, be made of niobium-zirconium, is provided with a coating 12 of aluminum or beryllium. The exterior surface of the coating 12 is provided with an oxide layer 13 produced by anodically oxidizing the coating through a part of its thickness extending from its outer toward its inner surface. The thickness of the metal layer 12, which acts as a low-ohm parallel resistance for the superconductor so as to reduce the degradation effect, is greater than the thickness of the oxide layer.

Figure 2:
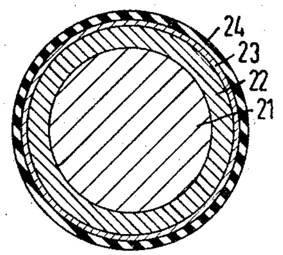

FIG. 2 shows another wire form of superconductor according to our invention. In this embodiment there is situated between the superconducting material and the outer sheath of aluminum or beryllium an intermediate layer of another material which during operation of the superconductor retains a good electrical normal conductivity and a good thermal conductivity. The superconducting core or wire 21, which, for example, is made of niobium-titanium, is surrounded and engaged by a layer 22 of a normally conducting metal such as, for example, copper. On this layer 22 there is a coating 23 made, for example, of aluminum and oxidized through part of its thickness extending from its outer toward its inner surface so as to form the insulating oxide layer 24. The aluminum layer 23 serves with this embodiment of a superconductor according to our invention primarily to protect the normal conducting metal layer 22 and therefore has only a thickness of a few $\mu$m.

The superconductor of our invention which is illustrated in FIG. 3 takes the form of a cable composed of a bundle of twisted wires. The individual superconducting wires 31 of the cable are respectively provided with coatings 32 of a metal which remains of normal electrical conductivity during operation of the superconductor. The intermediate spaces 33 defined between the individual wires are filled with a low-melting point metal of good thermal conductivity. The bundle of wires has an aluminum tape 34 wound therearound, and this tape is provided on one side with an aluminum oxide layer 35. The superconducting wires 31 are made in this case of high-field superconductor material such as, for example, niobium-zirconium or niobium-titanium. The metal for the coatings 32 may, for example, be copper, silver, gold, or preferably ultrapure aluminum or beryllium. Materials suitable for filling the spaces 33 are, for example, indium or the alloys tin-indium or lead-bismuth.

The superconductor according to our invention which is illustrated in FIG. 4 is composed of individual superconducting tapes 41 which are superposed in the manner shown in FIG. 4 so as to form a sandwich-like construction. The individual tapes 41 are covered with metal coatings 42 of normal electrical conductivity. These coatings are sandwiched between the tapes 41. The package which is composed of the individual coated conductors is surrounded by an aluminum or beryllium layer 43 which is provided at its outer surface with an oxide layer 44. The superconductors of the embodiment of FIG. 4 may be made of the same materials as those used in the embodiment of FIG. 3. Furthermore, the superconductors 41 which are in the form of tapes can be made of tapes which at their exterior surfaces or in their interiors have a layer of an intermetallic superconducting compound, particularly of niobium-tin.

FIG. 5 illustrates a coil having the windings thereof arranged in a plurality of layers, this coil being composed of the superconductor wire assemblies 51 of our invention. Each superconductor winding 51 is composed of a wire core 52 made of a superconducting material such as, for example, niobium-zirconium, and it is provided with an exterior coating 53 of aluminum or beryllium, this aluminum or beryllium coating being provided at its exterior with a layer of aluminum oxide or beryllium oxide 54. Between the individual winding layers are situated the cooling foils 55 made of ultrapure aluminum. In order to insulate these cooling foils they are provided at both sides with coverings in the form of oxide layers 56. The cooling foils 55 project at their side edge portions beyond the windings of the winding package and can, in this way, extend directly ino the refrigerating medium which surrounds the foil. Although the aluminum oxide layers 56 are themselves of good thermal conductivity, they can be removed from those portions of the cooling foil which project laterally beyond the package of windings, so that in this way the exposed aluminum, which is an even better thermal conductor, extends directly into contact with the refrigerating medium. The spaces defined between the adjoining superconductors 51 and the cooling foils are filled with an easily meltable metal 57 of good thermal conductivity and large heat capacity. As has already been mentioned, suitable filling materials for this purpose are indium, lead, gallium, tin-indium or lead-bismuth. The coil windings are carried by a tubular coil carrier 58 which, for example, may be made of chrome-nickel-steel. Instead of superconductors 51 having the particular details described above it is possible to use superconductors of our invention which are constructed differently.

In the description which follows reference is made to processes which may advantageously be used for the galvanic deposition of the aluminum and beryllium coatings on the superconducor as well as for the manufacture of the aluminum oxide or beryllium oxide insulating layers. In particular, aluminum and beryllium can be separated out of metallic organic electrolytes in ultrapure form and in a form having a good ductility, this separation of the aluminum and beryllium being provided while simultaneously depositing them on the high-field superconductor material. Also, the aluminum and beryllium coatings can be provided with the oxide layers at their exterior surfaces by way of an anodic oxidation process carried out in an aqueous electrolytic bath.

A particularly suitable aluminum organic electrolytic bath for the purpose of galvanically depositing the aluminum coating on a superconductor which may be provided with a coating of a normal conducting metal onto which the aluminum coating is galvanically deposited is a bath having the composition:

$$MX \cdot nAl(C_2H_5)_3 \cdot mL$$

where

M is an alkali metal or a quaternary onium group of the formula $$R^1R^2R^3R^4Y$$

X is a halogen, a pseudohalogen or another equivalent acid residue, and

L indicates a molecule of the solvent medium, $n$ is a number between 1 and 5, preferably 2.2 and $m$ is a whole number between 0 and 10.

In the formula $R^1R^2R^3R^4Y$ of the above-mentioned onium group, Y designates a nitrogen or phosphorus atom and $R^1$, $R^2$, $R^3$ and $R^4$ designate hydrocarbon residues with $C_1$ to $C_{12}$. Because of their small tendency to autooxidation and hydrolysis, it is particularly advantageous to use aluminum organic baths with onium groups where at least one of the hydrocarbon residues $R^1$ to $R^4$ is a residue of benzyl, phenyl, or cyclohexyl, or a strongly branched hydrocarbon residue with $C_3$ to $C_{12}$, while the remaining alkyl residues are provided with $C_1$ to $C_4$. Aluminum organic baths with such onium groups are practically inflammable in air.

The halogens which are used for X are preferably fluorine and chlorine, while as pseudohalogens CN and $N_3$ are preferred as well as other equivalent acid residues, in particular ½ $SO_4$.

Materials suitable for use as the solvent medium L are aromatic hydrocarbon and aliphatic, cycloaliphatic, as well as aryl-aliphatic ether, as well as halogen-containing heavy or primarily incombustible compounds of these categories, as long as they are capable of dissolving the aluminum organic electrolyte or capable of being mixed or forming an emulsion therewith without side reactions. Individual examples of the latter are benzol, toluene, diphenylether, dioxane, anisole, phenetole, bromobenzene, o-dichlorobenzene, m-dichlorobenzene, p-dichlorobenzene, benzalchloride and 2,3-dichlorodioxane.

Although it is preferred to use aluminum triethyls, $Al(C_2H_5)_3$, it is also possible to use instead ethyl aluminum derivates, such as, for example, $C_2H_5AlF_2$, aluminumtrimethyl $Al(CH_3)_3$ and other aluminum trialkyls with $C_3$—alkyl residue to $C_8$—alkyl residue, as well as their derivates as the material for forming the electrolytic complex. Because of their better specific conductivity, however, the aluminum ethyl compounds are preferred to the other aluminum alkyl compounds.

Particular examples of aluminizing baths are electrolytic liquids having a sodium fluoride complex:

$$NaF \cdot 2.2Al(C_2H_5)_3 \cdot 3 \text{ toluene}$$

and a trimethylbenzyl ammonium chloride complex:

$$[(CH_3)_3(C_6H_5CH_2)N]Cl \cdot 2.2Al(C_2H_5)_3 \cdot 6 \text{ xylene}$$

Both of these baths provide at a temperature of between 80 and 120° C. good deposition results. Instead of the sodium fluoride complex or the trimethylbenzyl ammonium chloride complex, it is possible to use for the electrolytic baths electrolyte complexes such as, for example, tetramethyl ammonium fluoride $[(CH_3)_4]F$, trimethylbenzyl ammonium fluoride $$[(CH_3)_3(C_6H_5CH_2)N]F$$

trimethylcyclohexyl ammonium chloride $$[(CH_3)_3(C_6H_{11})N]Cl$$

and triethylphenyl ammonium bromide $$[(C_2H_3)_3(C_6H_5)N]Br$$

For the galvanic manufacture of the beryllium coatings, it is suitable to use beryllium organic electrolytes of the composition:

$$[R^1R^2R^3R^4Y]X \cdot nBeR_2 \cdot mL$$

$R^1$–$R^4$, Y, X, L, $n$ and $m$ having the same significance as in the above formulas for the aluminum organic electrolytes, R being an alkyl residue having aliphatic or branched links with $C_1$–$C_8$. Examples of electrolytic liquids which contain the trimethylbenzyl ammonium fluoride complex or the triethylammonium chloride complex of berylliumdiethyl are:

$[(CH_3)_3(C_6H_5CH_2)N]F \cdot 2.2\ Be\ (C_2H_5)_2 \cdot 3$ xylene, and $[(C_2H_5)_4N]Cl \cdot 2.2\ Be\ (C_2H_5)_2 \cdot 3$ toluene The metal organic complex compounds which are contained in these electrolytes are described in greater detail in the periodical "Chemie-Ingenieur-Technik," of the year 1964, pages 616–637, and in the German patent application Akt. S.: S 94,664 IVb/120 of Dec. 17, 1964 (PLA 64/1842), the special properties of these compounds also being described therein.

It is possible to derive from the same baths ultrapure aluminum and beryllium which can be used as the initial material for the manufacture of thin tapes which are wound around the superconductor according to one of the embodiments of our invention. These tapes can be manufactured by rolling of the galvanically separated material.

In connection with a special embodiment of our invention, the galvanic deposition of aluminum in a continuous process in the form of a layer onto a wire or tape superconductor and the subsequent manufacture of an oxide layer by anodic oxidation will now be described in detail.

The superconductor wires and tapes are initially degreased in a degreasing bath, for example a bath sold under the trade name "Trinorm Fe" of Schering AG, and then are brought into an etching bath, for example $NH_4HF_2/H_2O$ or a sulfamate etching bath, to achieve an exterior surface free of oxides or other covering materials. Then the superconductor is thoroughly washed with deionized water and freed of water in an acetone bath. The acetone is then displaced by benzol. Then the superconductor with its clean, benzol-moist exterior surface is introduced into a galvanizing tank which is filled with one of the above-mentioned aluminum organic electrolytes such as, for example, $[(CH_3)_3(C_6H_5CH_2)N]Cl \cdot 2.2Al \cdot (C_2H_5)_3 \cdot 6$ xylene, the tank being maintained in a low-pressure atmosphere, somewhat greater than atmospheric pressure, of argon or nitrogen. By way of suitable rollers the superconductor is electrically connected with the negative pole of a source of direct current and is continuously guided through the electrolyte so that in this way it is provided with the coating in the form of a layer of aluminum. The temperature of the bath is approximately 80–120° C., the cathode current density approximately 1 amp per square decimeter, and blocks of aluminum-refined aluminum are used as the anode material. It is also possible to use inexpensive smelted aluminum, if the latter is enclosed within a cotton diaphragm to filter out and thus take up the finely divided anode sludge. The distance between the anode material and the superconductor which acts as a cathode is on the order of 1–2 cm. The potential between the anode and cathode is on the order of approximately 0.5–2 v. During the separation of the aluminum the electrolyte is maintained in motion for example by way of strong stirrers. The throughput speed of the wire or tape superconductor through the galvanizing tank depends upon the desired thickness of the aluminum layer, which will usually be on the order of 10–50 $\mu$m. and can be easily determined by simple tests. After leaving the galvanizing tank, the superconductor which is now provided with the layer of aluminum is directed into a washing bath of benzol, toluene or chlorobenzene, and then is guided through a hot drying and evaporating zone having a temperature of approximately 150–250° C., so that the electrolyte and solvent residues will be completely removed.

Without any intervening storage period, and thus as soon as possible and practically immediately, the superconductor provided with the aluminum coating is drawn through a suitable drawing die or pressure rolls, so that in this way the aluminum layer at the exterior of the superconductor is compacted and smoothed. The compacting and smoothing process is then followed by annealing for approximately one half hour at a maximum temperature of 400° C., so as to cure out whatever defects result from the cold deformation and strengthening of the aluminum coating, and which could result in an undesirable increase particularly of electrical residual resistance of the aluminum coating.

In order to manufacture the insulating aluminum oxide layer, the superconductor which is coated with the aluminum is brought into a known eloxidation bath, preferably in an oxalic acid GX-bath or in a sulphuric acid GS-bath. In the latter the aluminum coating of the superconductor is converted anodically through a part of its total thickness into an eloxal layer. It can be of advantage to use an oxalic acid bath having a composition of 50 grams of oxalic acid per liter of water. During the eloxation with this bath the current density is on the order of approximately 2 amps per square decimeter, the voltage between the cathode and the superconductor which acts as the anode is on the order of approximately 60 v. and the bath temperature is approximately 20–25° C. In accordance with the desired layer thickness of the eloxal layer, the superconductor remains in the eloxating bath for a period of 1–2 hours. After removal from the eloxating bath, the superconductor is advantageously washed for approximately 1–2 hours in running water and then in order to compact the aluminum oxide layer the superconductor is heated in distilled water for approximately one hour at a temperature of from 95–98° C. This heating can also be considered as sealing. In certain cases the pores of the eloxal or oxide layer, in order to increase the dielectric strength thereof, can be filled before compacting or sealing with an inorganic or organic pigment or with an insulating lacquer. In the event that the superconductor is to be used in coils which will encounter only relatively small electric potentials, so that the dielectric strength is not of primary importance, it can be of advantage to omit the sealing process. The oxide layer will then retain its porous structure which because of the particularly large exterior surface area resulting therefrom is of advantage for a good cooling.

The above-described eloxating process can be carried out in a similar way in order to achieve the aluminum oxide layers on the different embodiments of the superconductor assembly of our invention where aluminum tapes are used, the eloxating process being carried out either before or after the tape is wound around the superconductor.

In order to manufacture the beryllium coating and the insulating beryllium oxide layer, processes analogous to those used in the manufacture of the aluminum coating and the aluminum oxide layers are used.

As is apparent from the above-described examples, the provision of the oxide insulating layer on the superconductor can be brought about with simple processes which in particular can be easily carried out in a continuous manner.

We claim:

1. For use in a superconductive apparatus, in combination, a superconductor having an exterior surface, an insulator located at said exterior surface, and an intermediate layer of metal situated between said superconductor and said insulator, said intermediate layer of metal having at the operating temperature of the superconductor a good normal electrical conductivity and a good thermal conductivity, said insulator being an oxide of a metal selected from the group consisting of aluminum and beryllium, and said intermediate layer being a metal selected from the group consisting of copper, silver, and gold.

2. The combination of claim 1 and wherein said insulator is composed of an inner metal layer which is not oxidized and an outer metal layer which is in the form of an oxide, and said inner layer having a thickness which is at least equal to that of said outer layer.

3. The combination of claim 1 and wherein the metallic component of the oxide has a purity of at least 99.99% by weight.

4. The combination of claim 1 and wherein said superconductor is composed of a plurality of wires of high-field superconductor material respectively covered with coatings which, at the operating temperature of the superconductor, are of good normal electrical conductivity and good thermal conductivity, and said insulator having an outer surface directed away from and an inner surface directed toward said conductor and being in the form of said oxide only through a part of its depth extending from its outer toward its inner surface.

5. The combination of claim 4 and wherein said coated wires of high-field superconductor material define spaces between themselves, and wherein a metallic material of low melting point, good thermal conducting capacity and large heat capacity is situated at least partly in said spaces in contact with said coated wires forming at least a thin layer thereon.

6. The combination of claim 5 and wherein said metallic material in said spaces fills the latter spaces.

7. The combination of claim 5 and wherein said insulator is in the form of a thin band wound around said superconductor with edges of the wound band overlapping each other, and said wound band being anodically oxidized on only one side thereof.

8. The combination of claim 1 and wherein said insulator has an outer surface directed away from and an inner surface directed toward said superconductor and is in the form of said oxide only through part of its depth extending from said outer surface toward said inner surface, said superconductor being composed of a plurality of tapes of high-field superconductor material, said tapes being covered with coatings which are sandwiched between said tapes and which are made of a material which has a good electrical normal conductivity and a good thermal conductivity at the operating temperature of the superconductor.

9. The combination of claim 1 and wherein said insulator is in the form of an anodically oxidized band which is wound around said superconductor.

10. The combination of claim 9 and wherein said band has in the pores of the oxidized part thereof a filling selected from the group consisting of organic pigments, inorganic pigments, insulating lacquer, and said pores being sealed.

11. The combination of claim 1 and wherein said insulator has an outer surface directed away from and an inner surface directed toward said superconductor and said oxide extending only partly through said insulator from its outer toward its inner surfaces and having a porous structure.

12. The combination of claim 1 and wherein said superconductor and said insulator are wound into a coil and form a part of a superconductive magnet of the superconductive apparatus.

13. The combination of claim 12 and wherein said coil includes separate winding layers, and a plurality of foils respectively situated between and separating said winding layers, said foils being made of aluminum having a purity of at least 99.99% by weight.

14. The combination of claim 13 and wherein said foils have exterior surfaces provided with oxide layers.

15. The combination of claim 13 and wherein the individual winding layers are each composed of a plurality of wires defining spaces between themselves and a metallic material of low melting point and good thermal conductivity as well as large heat capacity being situated within and filling said spaces.

References Cited

UNITED STATES PATENTS

| | | | |
|---|---|---|---|
| 3,205,413 | 9/1965 | Anderson | 335—216 |
| 3,205,461 | 9/1965 | Anderson | 335—216 XR |
| 3,309,179 | 3/1967 | Fairbanks | 335—216 XR |
| 3,363,207 | 1/1968 | Brechna | 335—216 |

GEORGE HARRIS, *Primary Examiner.*

U.S. Cl. X.R.

174—110